United States Patent [19]

Jackson et al.

[11] Patent Number: 4,689,998

[45] Date of Patent: Sep. 1, 1987

[54] WHEELED VEHICLE TEST FIXTURE CONNECTOR

[76] Inventors: Gerald W. Jackson, 29526 Pearson, Selfridge, Mich. 48045; David S. Rohweder, 4973 10 Mile Rd. Apt. #6, Warren, Mich. 48091

[21] Appl. No.: 907,424

[22] Filed: Sep. 15, 1986

[51] Int. Cl.⁴ ............................................. G01N 29/00
[52] U.S. Cl. ..................................................... 73/669
[58] Field of Search .................. 73/669, 11; 74/16

[56] References Cited

U.S. PATENT DOCUMENTS

| | | | |
|---|---|---|---|
| 3,459,037 | 11/1966 | Holzman | 73/669 |
| 3,828,614 | 8/1974 | Borg | 74/16 |
| 4,263,809 | 4/1981 | Petersen et al. | 73/669 |
| 4,527,416 | 7/1985 | Haeg et al. | 73/669 |

Primary Examiner—Anthony V. Ciarlante

[57] ABSTRACT

A shaker mechanism for a wheeled vehicle has axle-connector devices that include special adapter plates for enabling the shaker mechanism to support a variety of different size vehicles with minimum adjustments to the shaker mechanism and with minimum time expenditure for change-over from one vehicle to another.

4 Claims, 6 Drawing Figures 4,689,998

WHEELED VEHICLE TEST FIXTURE CONNECTOR

GOVERNMENT INTEREST

The invention described herein may be manufactured, used, and licensed by or for the Government for governmental purposes without payment to us of any royalty thereon.

BACKGROUND AND SUMMARY OF THE INVENTION

This invention relates to a shaker mechanism for wheeled vehicles, e.g., trucks, tractors or trailers. Generally similar shaker mechanisms are shown in U.S. Pat. Nos. 3,459,037 and 3,828,614 and 4,527,416.

A typical vehicle shaker mechanism comprises four (or more) upright fluid cylinder actuators spaced apart in accordance with the vehicle wheel centerline dimensions and axle length dimensions. The number of actuators is a function of the number of axles on the vehicle. The cylinder actuators may be located in a pit or floor area of a test facility. The test vehicle is centrally positioned above the cylinders, such that each cylinder supports one of the vehicle axles (or outboard end areas of the axles).

The fluid cylinders are selectively energized to impart shaking forces to the vehicle axles. In many cases the cylinders are programmed or controlled by computer tapes, to provide standardized reproducible vehicle testing procedures and test results. In a typical situation the tape generates electric signals that are applied to electrically-operated valves controlling fluid flow to/from different ones of the fluid cylinders (actuators).

The various valves are selectively opened and closed to produce fluid cylinder motions, varied as to speed, stroke and frequency, according to the taped program. The vehicle undergoes a shaking action designed to equal or exceed rough terrain operations.

During the shaking operations it is necessary that the vehicle be rigidly attached to the fluid cylinder actuators; otherwise the vehicle will be displaced laterally off the actuators, with consequent destructive effects. Usually each axle is firmly clamped to the associated actuator. Additionally tie rods or chains may be connected between points on the vehicle frame and wall areas of the test facility (as added assurance that the vehicle will not shift horizontally). In some cases the horizontal tie rods take the form of fluid cylinder actuators that can be used to apply horizontal forces to the vehicle.

Shaker mechanisms have been proposed for use in testing various types of military vehicles including dump trucks, tractors, trailers, cargo carriers, fuel tank trucks, flat bed trucks, vans, bridge transporters, ammunition carriers, personnel carriers, radio command cars, etc. Such vehicles may vary in weight, overall length, axle length, and axle centerline spacing. The variable characteristics make it somewhat difficult for a given test facility to be readily or quickly adjusted to accommodate differently sized vehicles. As a result, it has not always been possible to test a given vehicle when it was desired to do so.

The present invention is directed to a shaker mechanism that can be used to test a wide variety of different vehicles, with minimal need for costly or time-consuming adjustments to the shaker mechanism or to the vehicles undergoing test.

One object of the invention is to provide a shaker mechanism that connects with axle areas of a vehicle, to thereby permit the tested vehicle to shake or move substantially in the same manner (or to the same extent) as it would during actual rough terrain operations. The vehicle components (e.g., suspension springs, axles, frame, engine mounts, etc.) are subjected to the same (or greater) forces that they would be exposed to in actual service. The test becomes a realistic test that can be confidently used to predict vehicle component performance (or non-performance).

A further object of the invention is to provide a shaker mechanism that can be rigidly and firmly attached to the axles of test vehicles, thereby minimizing possible displacement of the vehicle from the shaker mechanism.

BACKGROUND PRIOR ART

U.S. Pat. No. 3,828,614 dated Aug. 13, 1974 illustrates some features of a shaker mechanism that has been used to test military wheeled vehicles. The mechanism suffers somewhat in that it requires some modification or adaptation of the vehicle structure in order to properly connect the vehicle to the shaker mechanism. As noted at column 8, lines 55 through 60, of the patent, the universal joints at each wheel must be taken apart before making the necessary connections.

The shaker mechanism of U.S. Pat. No. 3,828,614 is designed to connect with the suspension areas of the test vehicles, not the axle areas (as proposed in our invention). The shaker mechanism of the patent can only be used with vehicles having a specific suspension geometry. The patented mechanism is not suited for use with a wide variety of vehicles.

U.S. Pat. No. 4,527,416 dated July 9, 1985 shows a shaker mechanism that comprises four powered actuators, one for each vehicle wheel. Each actuator includes a pad or plate 22 designed to engage the "footprint" area of a vehicle tire. Some of the pads have upstanding chocks (blocks) 50 oriented to prevent lateral side-to-side dislocation of the associated vehicle tires. Some of the pads have tire-restraint bars 40 designed to prevent fore-and-aft motions of the associated tires on the pads.

The mechanism of U.S. Pat. No. 4,527,416 apparently does not include any devices for preventing upward dislocation of the vehicle tires from pads 22. It is believed that severe vertical oscillations of the mechanism would (or might) allow the vehicle to be detached from the mechanism. The mechanism of U.S. Pat. No. 4,527,416 is also believed to be disadvantageous in that the vehicle tires tend to flex so as to dampen the effect on the vehicle of the vertical oscillations generated by the shaker mechanism.

U.S. Pat. No. 3,459,037 to Holzman, dated Aug. 5, 1969, shows a shaker mechanism that includes vertically-oscillating actuators 21 having fixtures 42 (or 44) attachable to axle areas of the test vehicle. The axle-attachment devices take the form of special tube-like adapters 140 (FIG. 7) or 112 (FIG. 5) fittable onto the axles. Before the axle-fixture connections can be made some axle components must first be removed, e.g. the brakes and wheel bearings. The system of U.S. Pat. No. 3,459,037 is apparently tailored to a specific vehicle.

SUMMARY OF OUR INVENTION

We propose a shaker mechanism that includes four (or more) separate actuators for imparting vertical oscillatory forces to the vehicle axles. The vehicle undergoing test is modified (or changed) only to the extent of removing its wheels. Each of the separate actuators includes adapter plates (substitute wheels) having a plural number of openings therethrough arranged in the same pattern as the stud openings in the actual vehicle wheels. After the wheels have been removed from the vehicle, the vehicle can be attached to the shaker mechanism actuators by moving the adapter plates into the spaces previously occupied by the wheel discs. Conventional wheel nuts are used to rigidly (firmly) attach the vehicle to the shaker mechanism. After shaker testing of the vehicle has been completed the vehicle may be detached from the shaker mechanism by simply unscrewing the wheel nuts. During the operations of connecting/disconnecting the vehicle relative to the shaker mechanisms, the vehicle is suitably supported, e.g., by an overhead crane and sling system. Heavy (large) vehicles usually have larger diameter wheel-tire assemblies (i.e. larger than lighter vehicles). The number of wheel studs (and stud spacing) varies somewhat from vehicle to vehicle, depending on vehicles size. To accommodate our shaker mechanism to different vehicles we propose to provide separate sets of adapter plates for each vehicle (or vehicles) having the same wheel stud pattern. Each set of adapter plates will have a different hole pattern. The different sets of adapter plates will have a common diameter so as to be interchangeably used with the four (or more) shaker actuators. Hole spacing and number of holes in a given set of adapter plates will correspond to the stud spacing on the axle hub area of a particular vehicle (or group of vehicles) undergoing test. By selecting the appropriate set of adapter plates for use with a common (standard) shaker mechanism, it should be possible to use the mechanism for testing a variety of different vehicles.

Different vehicles have different wheel base dimensions and axle lengths. To accommodate the shaker mechanism to different vehicles it is possible to bodily adjust (reposition) the four (or more) actuators. However, each actuator is a relatively large (heavy) structure, such that relocating each actuator is a relatively time-consuming operation. We contemplate adjustment devices within each actuator, whereby the axle-attached fixture is capable of lateral (horizontal) motion relative to the cylinder-piston portion of the actuator. Minor adjustments in fixture location can be made quickly without special skill or precise measurements on the vehicle or on the shaker mechanism.

Our proposed shaker mechanism is believed to have a versatility (range of usefulness) not present in prior art mechanisms.

THE DRAWINGS

FIG. 1 IN DETAIL

Figure 1:
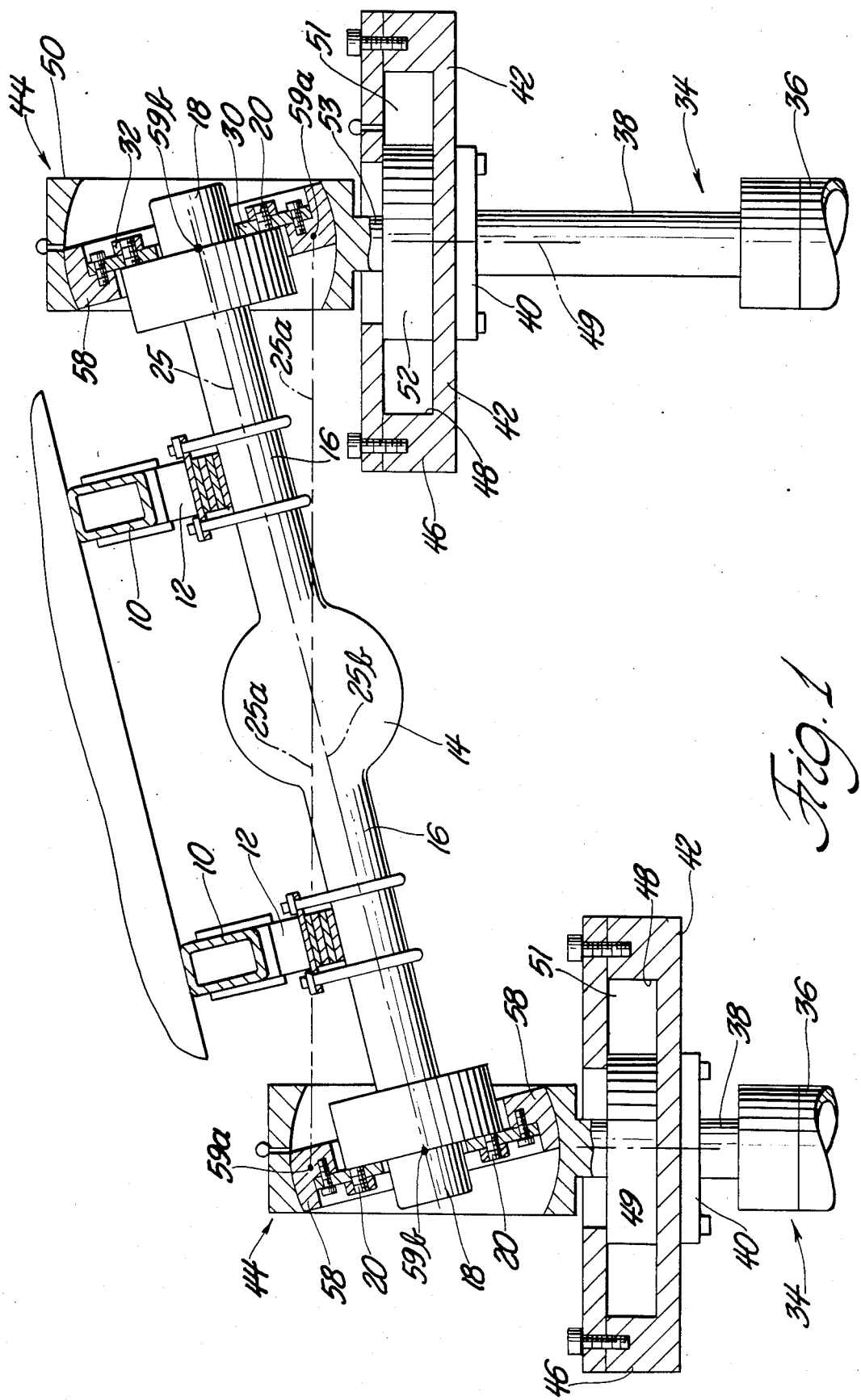
FIG. 1 is fragmentary elevational view of a shaker mechanism embodying our invention. Certain component parts of the mechanism are shown in section.

FIG. 1 illustrates one axle of a vehicle supported on a shaker mechanism constructed according to our invention; the other axle is not shown. The vehicle is of standard construction, including longitudinal frame members 10, leaf type suspension springs 12, differential 14, and axle 16. Outboard end areas of the axle include rotary hubs 18 of standard design. Each hub 18 has a number of threaded studs 20 projecting laterally outwardly to extend through openings in disc areas of the road wheels; the wheels are not shown, since they have been removed to facilitate attachment of the axle to the shaker mechanism.

Figure 2:
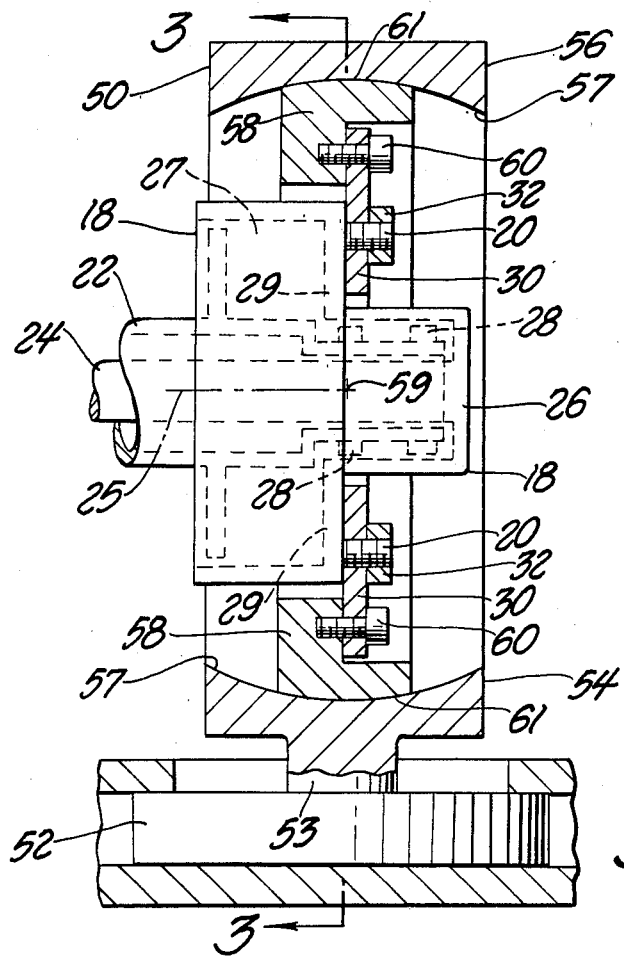
FIG. 2 is an enlarged sectional view of a structural detail used in the FIG. 1 mechanism.

FIG. 2 illustrates some features of the axle in greater detail. The axle includes a non-rotary axle housing 22 of tubular construction extending into a rotary wheel-reception hub 18. A rotary axle (shaft) 24 extends from differential 14 within housing 22; the outboard end of axle 24 is bolted or otherwise affixed to cup area 26 of hub 18. Conventional roller bearings 28 support hub 18 (and axle 24) for rotation on the end area of axle housing 22. The large diameter section of hub 18 accommodates a brake assembly (within annular space 27).

The aforementioned studs 20 project outwardly from wall area 29 of hub 18 in general parallelism with the axle axis 25. The studs are arranged in a ring pattern centered about axis 25. Usually the studs are equidistantly spaced in the circumferential direction. The number of studs (and stud spacing) varies according to the size of the vehicle and the type of service for which the vehicle was designed. With smaller vehicles only four or five studs 20 may be used on each hub 18; larger vehicles may have as many as ten or twelve studs on each hub 18. The studs are usually located near the outer periphery of the hub in order to better handle circumferential loads imposed thereon by the wheel-tire assembly.

Our invention utilizes studs 20 to attach (mount) the vehicle on our shaker mechanism. As shown in FIG. 2, the mechanism includes an annular adapter plate 30 engaged with hub wall 29. Plate 30 has a plural number of circular openings therethrough for reception on studs 20. Conventional wheel nuts 32 are threaded onto the exposed ends of studs 20 to firmly (rigidly) affix plate 30 to hub 18. The vehicle may be detached from the shaker mechanism by unthreading nuts 32 from studs 20.

It will be seen from FIG. 1 that axle 16 is attached to the shaker mechanism by connections at each end of the axle. In the case of a powered axle (shown in FIG. 1) the axle may be an elongated structure extending crosswise of the vehicle for the full width of the vehicle. In the case of the non-powered axles, each axle may be a shorter structure occupying only a corner area of the vehicle; the axle may be affixed to suspension arm units, of the type shown for example in U.S. Pat. No. 3,459,037 (see numeral 46 in FIG. 3).

The complete vehicle typically has four (or more) axle sections (one for each road wheel); each axle section has a hub section 18. Our shaker mechanism comprises four (or more) separate powered actuators 34 arranged in a rectangular pattern according to the wheel spacing. Each powered actuator will be located approximately directly below the space occupied by one of the hub connections 18 (i.e. the space occupied by the road wheel).

Each powered actuator comprises a stationary upright fluid cylinder 36 and vertically movable piston rod 38. The upper end of each rod 38 comprises a circular pad 40 whose upper surface supportably engages a flat "pancake" like housing 42. Housing 42 serves as a support device for an axle-support fixture 44; housing 42 also acts as a device for permitting lateral (horizontal) adjustment of the associated fixture 44.

Housing 42 includes a cylindrical peripheral side wall 46 having a circular inner surface 48 defining a flat pancake-like cavity or chamber 51. Fixture 44 comprises an annular upright housing 50; the lower end of housing 50 is attached to a neck member 53 that is in turn connected to a circular shoe 52. Shoe 52 is slidably positioned in chamber 51. Due to the diameter differences between shoe 52 and chamber 51, fixture 44 can slide horizontally (laterally) around axis 49 of piston rod 38, or away from the piston rod axis in any horizontal direction.

Horizontal sliding adjustment of housing 50 facilitates attachment of the vehicle axle to the shaker mechanism. The fixture housing can be shifted horizontally to align adapter plate 30 with studs 20 (even though the piston rod axis 49 does not directly intersect axle axis 25). Fixture 44 can be shifted in or out, or side-to-side, or around axis 49, until the openings in adapter plate 30 align with studs 20. When the adapter plate holes are aligned with studs 20, fixture 44 can be pushed inboard (toward axle 16) to thus move the adapter plate against hub wall 29 (FIG. 2). With plate 30 in position, nuts 32 can be threaded onto studs 20 to firmly attach fixture 44 to the vehicle axle. During the attaching process the vehicle will be suspended from an overhead crane via a sling system; the vehicle will be essentially stationary, with axle 16 having an essentially horizontal attitude (not as shown in FIG. 1).

FIGS. 2 AND 3—FIXTURE DESIGN

Figure 3:
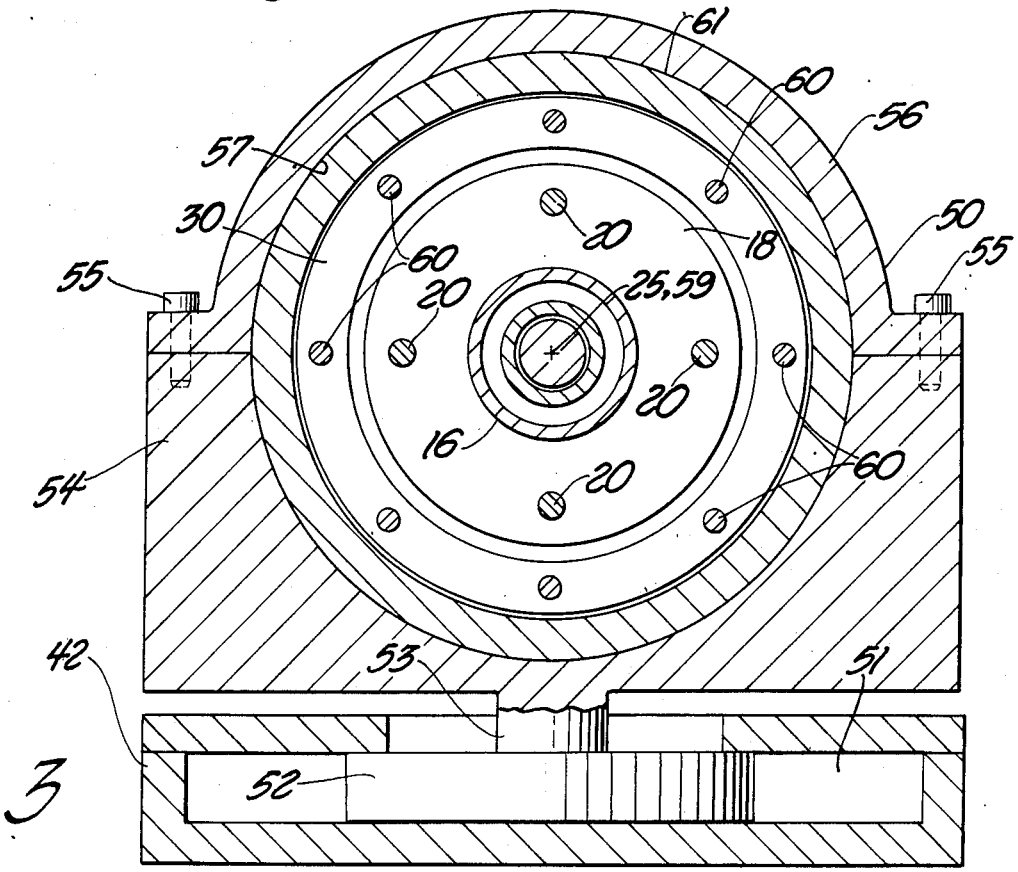
FIG. 3 is a sectional view on line 3—3 in FIG. 2.

FIGS. 2 and 3 illustrate some details of the axle-support fixture 44 design not apparent from FIG. 1. FIGS. 2 and 3 are applicable to either the left or right hand fixture 44 (FIG. 1).

As seen in FIG. 3, upright housing 50 is comprised of a lower housing element 54 and an upper housing element 56; the two housing elements are bolted together, as at 55. The interior surface 57 of housing 50 is a spherical surface centered on an imaginary point 59. Point 59 is located on axis 25 and on the outer face of wall 29, i.e. at the point where the outer face of wall 29 intersects axis 25.

The aforementioned adapter plate 30 is removably attached to an annular axle-support element 58 via bolts 60. The outer peripheral surface 61 of element 58 is a spherical surface centered on aforementioned center point 59, such that annular element 58 can rotate within housing 50 around point 59. The inner surface 57 of housing 50 acts as a bearing surface for element 58.

Annular element 58 and plate 30 are rigidly attached to one another and to axle 16. Vertical motion of housing 50 (by powered actuator 34) is transmitted through element 58 and plate 30 to the axle. Elements 58 and 30 can rotate around point 59 (in any plane passing through point 59). The motion can be viewed as a universal rotary motion around point 59.

OVERALL AXLE MOTION

FIG. 1 shows the axle in a tilted condition (tilted to the left). The rightmost actuator 34 is in a powered-up condition, while the leftmost actuator is in a powered-down condition. As the actuators oscillate vertically the axle 16 assumes varying positions of tilt. Numeral 25a designates the axle axis when the axle is in its normal non-tilted condition; numeral 25b designates the axle axis when the axle is in its FIG. 1 tilted condition. The axle can also tilt to the right (so that the right end of the axle is lower than the left end). As the axle shifts between its various positions the aforementioned center points 59 move between imaginary points 59a and 59b; there is a slight horizontal change (displacement) of each center point 59. Axle support element 58 maintains an attitude normal to the axle axis; therefore element 58 undergoes a swivel motion in housing 50. Additionally housing 50 slides horizontally relative to support housing 42 in accordance with the horizontal displacement of center point 59 (between points 59a and 59b). The slidable relation between each shoe 52 and support housing 42 permits the necessary displacement of center points 59.

Axle 16 may also undergo a slight change in attitude in the fore-aft direction (i.e. normal to the plane of the paper in FIG. 1). Shoes 52 can shift within the associated cavities 51 to accommodate such fore-aft motions.

It will be understood that the other not-illustrated axles are simultaneously undergoing oscillatory motions similar to those herein described. The various actuators 34 will be individually programmed to subject the vehicle to twisting, tilting motions, both laterally and longitudinally. The individual fixtures 44 permit individual swivel movements of the axle sections around center points 59; the support housings 42 permit slight shifting movements of fixture housings 50 to accommodate lateral displacements of center points 59.

CONSTRUCTION OF FIGS. 4 AND 5

Figure 4:
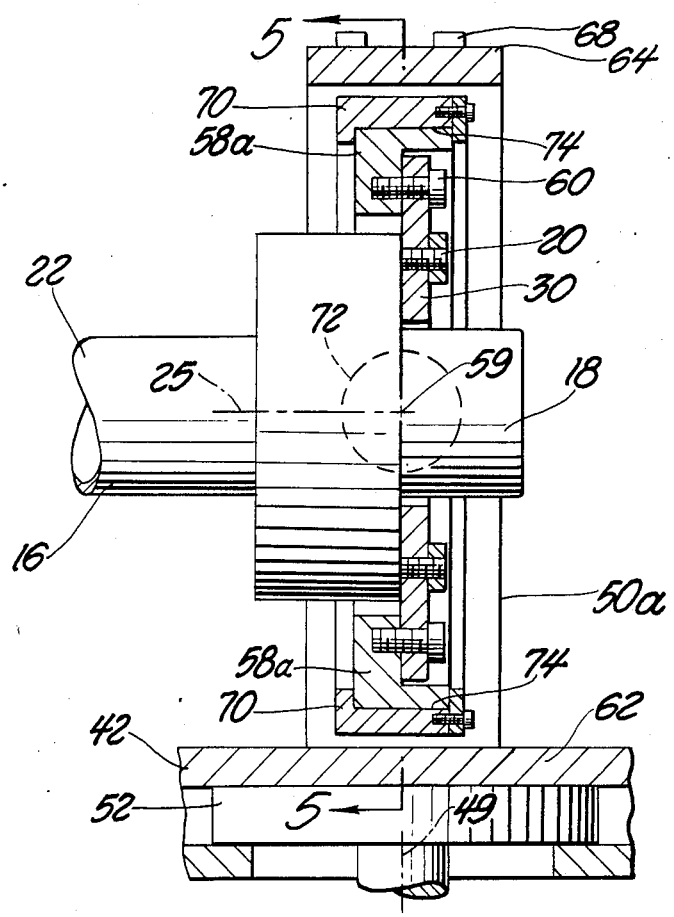
FIG. 4 is a sectional view taken in the same direction as FIG. 2, but illustrating a second embodiment of the invention.
Figure 5:
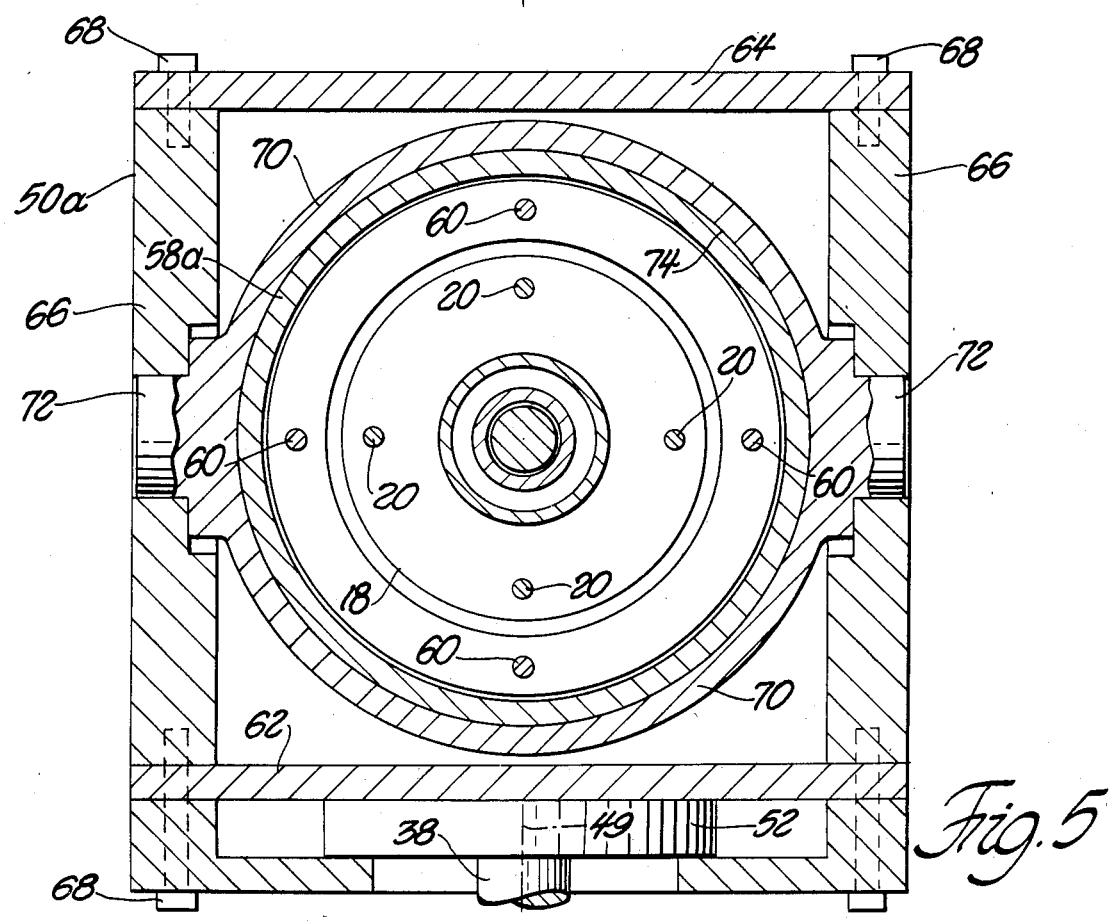
FIG. 5 is a sectional view on line 5—5 in FIG. 4.

The structure depicted in FIGS. 2 and 3 represents the presently preferred embodiment of our invention. FIGS. 4 and 5 illustrate some variations in structural design that can be employed while still practicing the invention.

One variation concerns the structure used to permit lateral shift of the fixture 44. The components are reversed, i.e. shoe 52 is affixed to the upper end of piston rod 38, and housing 42 is affixed to the upstanding housing 50. Housing 42 can shift laterally on shoe 52 in any horizontal direction, i.e. around the piston rod axis 49, or in any direction toward or away from axis 49.

In the arrangement of FIGS. 4 and 5 the aforementioned universal motion of the annular axle support element 58 is a resultant motion of several separate mechanisms, rather than a single swivel motion of a single member 58, as in FIGS. 2 and 3.

In FIGS. 4 and 5, housing 50a is defined by a lower plate 62, upper plate 64 and two end plates 66. Plate 62 serves as the upper wall of housing 42; therefore it has a circular plan configuration. The other plates 64 and 66 are rectangular plates. The various plates may be bolted together, as at 68.

An annular ring-like member 70 is located within the space circumscribed by housing 50a. Stub shafts 72 project from member 70 into circular openings in walls 66, whereby member 70 can pivot (rotate) around the stub shaft axis. The inner annular surface 74 of member 70 acts as a bearing 10 surface for the annular axle-support element 58a. Element 58a can rotate within member 70 around axle axis 25. Member 70 can rotate (tilt) in housing 50a around the axis of stub shafts 72. Additionally, housing 50a can rotate in a horizontal plane around piston rod axis 49. 15 The various described rotational motions enable the axle to shift in the same manner as the axle shown in FIG. 1. FIGS. 4 and 5 represent an alternative to the preferred structure shown in FIG. 2 and 3. Other minor changes may be made while still practicing the invention.

FIG. 6

Figure 6:
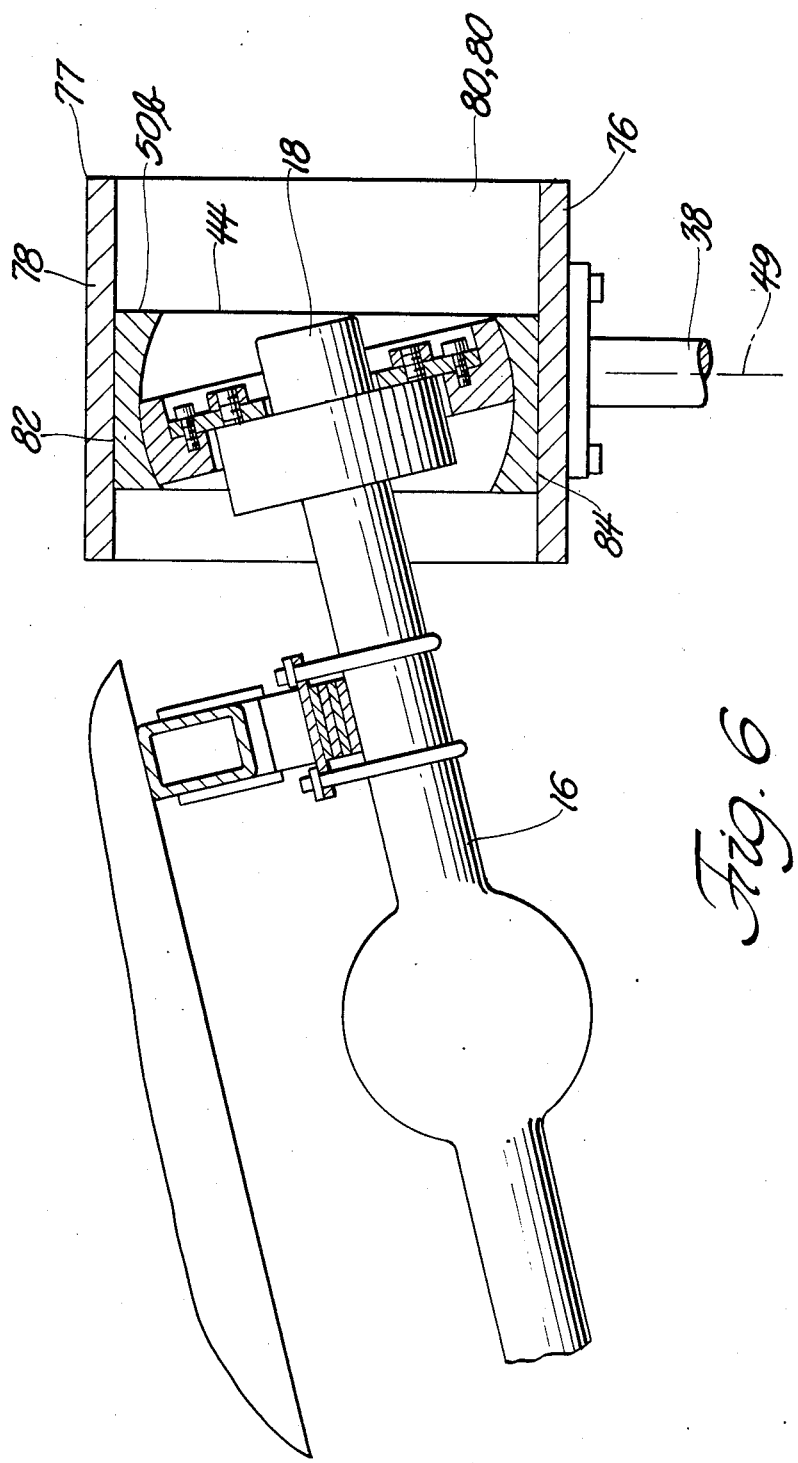
FIG. 6 is a fragmentary sectional view of a third structural arrangement embodying our invention.

FIG. 6 illustrates an alternative mechanism for adjustably mounting fixture 44 on the upper end of piston rod 38. The mounting mechanism comprises a rectangular frame 77 bolted to pad 40 at the upper end of rod 38. The frame comprises a flat lower wall 76, flat upper wall 78, and two end walls 80 (only one is visible in the drawing). The confined fixture housing 50b has flat upper and lower surfaces 82 and 84 slidably engaged with walls 78 and 76. Also, the space between the frame walls 80 is somewhat greater than the lateral dimension of housing 50b. Therefore, housing 50b can shift horizontally within frame 77, either in and out (within the plane of the paper) or side-to-side.

The fixture 44 of FIG. 6 is the same as fixture 44 shown in FIGS. 1 and 2, except for the described adjustable mount structure.

VEHICLE TIE-DOWN MECHANISMS

Each fixture 44 shown in FIG. 1 can shift horizontally around piston rod axis 49 and also laterally toward or away from piston rod axis 49. Assuming the same fixture 44 construction is used at each of the four (or more) hub connections 18, then the entire vehicle will be capable of horizontal shifting movement, longitudinally or laterally. Such shifting motions of the vehicle may not be especially desired or needed for realistic testing of the vehicle structural integrity.

It is contemplated that the vehicle will be restrained against horizontal shifting motions, by the use of tie rods or chains extending horizontally between points on the vehicle chassis and the side walls of the testing facility. Such lateral restraints have been used in the past, and are not new in the art.

FEATURES OF THE INVENTION

A primary feature of considerable practical importance is the fact that the vehicle does not have to be modified or changed in order to be mounted on the shaker mechanism (powered actuators 34). All that has to be done is to remove the wheels from the vehicle. The vehicle suspension, brakes, wheel bearings, etc. remain in place on the vehicle.

U.S. Pat. No. 4,527,416 shows a vehicle shaker mechanism wherein the vehicle is not required to be modified in order to mount the vehicle on the shaker structure (powered actuators). In the arrangement of U.S. Pat. No. 4,527,416 the vehicle is located with its tires resting on support pads 22 at the upper ends of the individual actuators. The vehicle can be attached to the shaker mechanism relatively quickly.

However, the arrangement of U.S. Pat. No. 4,527,416 is not believed to be a completely satisfactory apparatus because it has no devices for holding the tires on pads 22. For example, FIG. 5 of the patent shows two blocks 50 for restraining the tires from lateral movement, but no devices for preventing the tires from bouncing off the surface of pad 22.

During severe oscillatory movements of the powered actuators inertia forces imparted to the vehicle may allow the vehicle to move upwardly while one or more of the pads 22 are moving downwardly. Perhaps the inventors of the arrangement shown in U.S. Pat. No. 4,527,416 envisioned that the vehicle suspension springs would maintain the tires in engagement with pads 22. However, it is doubtful that such engagements could be maintained under severe test conditions. e.g., high amplitude oscillations and small suspension stroke distances.

The system of U.S. Pat. No. 4,527,416 is also believed disadvantageous in that tire flexure would tend to dampen or reduce the force inputs to the vehicle axles. With our proposed arrangement the force inputs are applied by the powered actuators directly to the vehicle axles through rigid connections. There are no tires or similar deformable elements tending to reduce the forces imparted to the axles.

The system of U.S. Pat. No. 4,527,416 is also believed disadvantageous as regards possible tire blowout. Under severe testing operations very high forces are delivered by the actuators to the vehicle components. With heavy vehicles (e.g., twenty tons) the forces on the tires may well be greater than road forces normally encountered (especially in so-called accelerated life testing). Tire blow outs are a problem with the system disclosed in U.S. Pat. No. 4,527,416.

Our proposed arrangement provides rigid (rotary) connections between the powered actuators and the vehicle axles. At the same time the connections are sufficiently adjustable or flexible that a range of different vehicles can be supported and tested. Each adapter plate 30 has a diameter large enough that annular member 58 is outside the stud 20 ring pattern for the largest vehicle to be tested. Different adapter plates 30 having different numbers of stud 20 openings therethrough can be interchangeably used with standard axle-support members 58.

It is contemplated that each fixture 44 will have one housing 50, and one annular axle-support element 58. Different adapter plates 30 will be used with element 58, according to the number of studs 20 on the vehicle axle to be tested. As noted previously, the number of studs 20 per axle may vary from four up to twelve, depending primarily on the vehicle weight. The adapter plates 30 will be selected to "adapt" the shaker mechanism to different vehicles.

Flexibility is built into our mechanism by use of the shiftable shoes 50 slidably arranged within the pancake housings 42. Such flexibility is advantageous during the time periods when the vehicle is being connected to the shaker mechanism (or being disconnected from the shaker mechanism). The fixtures 44 can be moved back and forth to align the adapter plates 30 with studs 20 without any changes in the positions of actuators 34 (although the actuators may be powered up or down if necessary). Plates 30 can be moved against the surfaces of hub walls 29 (FIG. 2) merely by shifting the associated fixtures 44.

The adjustability provided by shoes 50 and housings 42 compensates for tolerance deviations in vehicle construction. The adjustability also allows for small design differences of different vehicles (principally different wheelbase dimensions and overall axle length dimensions). Of course, large vehicle dimension differences require adjustments in actuator position.

The adjustability provided by shoes 50 and housings 42 also comes into play during shaker performance in that it permits the axle connection swivel points 59 to shift in and out as the axle is tilted by the powered actuators.

The powered actuators apply forces to the axles at approximately the same points as the road wheels (during performance on the road). The test approximates (or exceeds) actual road stresses. The axles are subjected to stresses in the yaw, pitch and roll planes even though the force inputs are only vertical (i.e., only four (or more) powered vertical actuators are used).

The system herein proposed is believed to have a range of usefulness not achieved by other known systems, such as the systems shown in U.S. Pat. Nos. 3,828,614 or 4,527,416 or 3,459,037.

U.S. Pat. No. 3,459,037 to Holzman is thought to be the closest approximation of our invention. FIG. 5 of the Holzman patent fragmentarily shows a mechanism for supporting the vehicle rear axle housing 44 in a shaker fixture 42. A sleeve member 114 is inserted into the end of the axle housing; a retaining member 120 secures member 114 within the axle housing via a bolt 129. Additional bolts 133 are used to secure member 120 in the axle housing.

The outboard end of member 114 is slidably received in a sleeve 106 carried by spherical element 102; element 102 is universally rotatable within a spherical socket formed in a transversely slidable block 64. The mechanism permits fixture 42 to transmit shaker forces to the axle housing in approximately the same fashion as proposed herein.

However, use of the Holzman mechanism apparently requires some modification of the vehicle before the mechanism can be attached to the axle housing. Apparently the wheel bearings, brakes and rotary axle shaft must be removed before sleeve member 114 can be attached to the axle housing. The operation of attaching sleeve member 114 to the axle housing is apparently a complex procedure, since members 114 and 120 must be inserted into the axle prior to positionment of the vehicle alongside fixture 42.

After Holzman's member 114 is affixed to axle housing 44, there would be a problem in telescoping the outboard end of member 114 into sleeve 106. Apparently the components within block 64 would have to be disassembled and reassembled around member 114 to effect an operative connection between member 114 and fixture 44.

The Holzman system seems to be tailored to specific vehicle dimensions, especially specific axle housing diameters. Each different axle size requires a different set of mounting components (members 114, 120, 106, etc.). Our proposed use of low cost interchangeable adapter plates 30 is believed to be an improvement over the complex mounting system proposed by Holzman, both as regards cost and installation time. Additionally, our system permits testing of the rotary axle component, bearings, brakes, etc. in a manner not possible with the Holzman mechanism.

We do not desire to be limited to the exact details of construction shown and described for obvious modifications will occur to a person skilled in the art, without departing from the spirit and scope of the appended claims.

We claim:

1. In a shaker mechanism for wheeled vehicles, wherein each vehicle has a plural number of axles, each axle including a rotary hub and a plural number of threaded studs centered in a ring pattern around the axle axis; said shaker mechanism comprising a plural number of fixtures, one for each axle; and a powered actuator supportably connected to each fixture for imparting vertical oscillatory forces thereto:

the improvement wherein each fixture comprises an annular housing; an annular axle-support element located within each housing for universal rotary motion around a point on the axle axis; and an annular adapter plate removably attached to each axle-support element; each adapter plate having a number of circumferentially-spaced openings therethrough arranged in the same ring pattern as the aforementioned studs, whereby each said adapter plate can be fitted onto an axle hub with the studs extending through the adapter plate openings; and nuts threaded onto the studs to rigidly secure the adapter plate to the hub;

the adapter plates being sufficiently sized so that adapter plates having different numbers of stud openings therethrough can be removably attached to a given axle-support element, thereby achieving a significant commonality of fixture components while continuing to use existing fixtures with a range of different wheeled vehicles.

2. The improvement of claim 1 wherein each actuator comprises a vertically oriented fluid cylinder means; each fluid cylinder means comprising a piston rod movable on a vertical axis; each fixture being connected to an upper end of the associated piston rod; at least some of the fixtures being capable of horizontal shifting adjustments around the piston axis and also toward or away from the piston axis.

3. The improvement of claim 2 wherein the horizontal shifting adjustments are achieved by means of circular shoes confined within circular pancake housings; each shoe having a diameter substantially smaller than the internal diameter of the confining housing, whereby the shoe can slide or turn in any direction, within the horizontal plane established by the housing.

4. The improvement of claim 1 wherein each axle-support element has a spherical exterior surface, and each annular housing has a spherical interior surface; the two spherical surfaces being slidably engaged, whereby the axle-support element has universal rotational adjustability in the annular housing.

* * * * *